United States Patent
Orbach

(10) Patent No.: US 8,493,201 B2
(45) Date of Patent: Jul. 23, 2013

(54) SAFETY ARRANGEMENT FOR AND METHOD OF ALERTING VEHICLE OPERATOR TO REMOVE REAR OCCUPANT FROM PARKED VEHICLE

(76) Inventor: Chaim Sinai Orbach, Lakewood, NJ (US)

( * ) Notice: Subject to any disclaimer, the term of this patent is extended or adjusted under 35 U.S.C. 154(b) by 455 days.

(21) Appl. No.: 12/833,368

(22) Filed: Jul. 9, 2010

(65) Prior Publication Data

US 2011/0102169 A1     May 5, 2011

Related U.S. Application Data

(60) Provisional application No. 61/225,190, filed on Jul. 13, 2009.

(51) Int. Cl.
*B60Q 1/00* (2006.01)
(52) U.S. Cl.
USPC .......... 340/457; 340/686.1; 340/573.1; 340/425.5; 340/426.1; 180/273

(58) Field of Classification Search
USPC .......... 340/686.1, 573.1, 425.5, 426; 180/273
See application file for complete search history.

(56) References Cited

U.S. PATENT DOCUMENTS

| | | | |
|---|---|---|---|
| 6,930,614 B2 * | 8/2005 | Rackham et al. | 340/686.1 |
| 8,058,982 B2 * | 11/2011 | Crowe et al. | 340/455 |

* cited by examiner

*Primary Examiner* — Daryl Pope
(74) *Attorney, Agent, or Firm* — Kirschstein, et al.

(57) ABSTRACT

A safety arrangement for alerting an operator of a parked vehicle having an ignition and rear doors that a rear occupant, e.g., a child, is still present in a rear of the vehicle, includes door sensors for detecting when either rear door is open or closed, an ignition sensor for detecting when the ignition is activated or deactivated, a programmed controller responsive to each door sensor and the ignition sensor, for automatically activating the arrangement when either rear door has been opened for a predetermined time period, and for generating an alert signal in response to detection that the ignition has been activated, followed by subsequent detection that the ignition has been deactivated, and an alarm responsive to generation of the alert signal for alerting the operator to remove the rear occupant from the parked vehicle.

18 Claims, 3 Drawing Sheets

SAFETY ARRANGEMENT FOR AND METHOD OF ALERTING VEHICLE OPERATOR TO REMOVE REAR OCCUPANT FROM PARKED VEHICLE

CROSS REFERENCE TO RELATED APPLICATION

This application claims the priority of U.S. Provisional Patent Application Ser. No. 61/225,190, filed Jul. 13, 2009.

BACKGROUND OF THE INVENTION

The present invention generally relates to the field of vehicle safety equipment and, more particularly, to an arrangement for, and a method of, alerting a vehicle operator to remove a rear occupant, e.g., a child, from a parked vehicle.

DESCRIPTION OF THE RELATED ART

There is almost nothing more tragic than the negligently caused death of an infant or young child, especially when caused by the carelessness of the child's own parent. Every year, more and more children are injured or die by being left unattended, even for a few minutes, inside of parked vehicles due to elevated vehicle interior temperatures. Temperatures of 100 degrees Fahrenheit and up develop rapidly in a closed environment of a parked vehicle and can cause heat stroke and be fatal for children whose small bodies cannot readily efficiently regulate their core body temperatures. A child's core body temperature can increase three-to-five times faster than an adult's. Analogously, elevated vehicle interior temperatures can injure pet animals who are left unattended in parked vehicles.

The art has proposed child safety equipment in the form of weight-responsive switches incorporated in child safety seats or seat cushions for alerting vehicle operators of the presence of children in parked vehicles. However, child safety seats or cushions are removable accessories and may not be available when needed. Also, some children occupying a vehicle rear seat may not use a safety seat at all. The rear seat occupant may be a pet animal who uses no safety seat. Hence, weight-responsive systems can be easily circumvented.

Accordingly, there is a need for a fail-safe safety arrangement that automatically activates itself to provide an alarm, preferably audible, to a vehicle operator of the continued presence of an occupant that needs to be removed from the rear of a parked vehicle.

SUMMARY OF THE INVENTION

This invention resides, briefly stated, in a safety arrangement for alerting an operator of a parked vehicle having an ignition and at least one rear door that a rear occupant is still present in a rear of the vehicle. The rear occupant is preferably a child or infant strapped into a safety seat, but can also be a child not using a safety seat, or any person, including an adult, especially one who is handicapped, either mentally or physically, or any animal, such as a pet dog or cat. The rear occupant could also be an inanimate object, such as a briefcase or some valuable, whose removal from the parked vehicle is desired.

In accordance with one aspect of this invention, a door sensor is provided for the at least one rear door, and preferably for each of two rear doors, and is operative for detecting when either rear door is in an open state or in a closed state. An ignition sensor is also provided for detecting when the ignition is in an activated state or in a deactivated state. Also provided is a programmed microprocessor or controller responsive to each door sensor and the ignition sensor, for automatically activating the arrangement when either rear door has been in the open state for a predetermined time period, e.g., about three seconds, and for generating an alert signal in response to detection of the activated state of the ignition, followed by subsequent detection of the deactivated state of the ignition. An alarm is responsive to the generation of the alert signal, for alerting the operator to remove the rear occupant from the parked vehicle.

The alarm is preferably audible and includes a first sound generator, e.g., a chime speaker, for emitting sound at a first sound level for an initial time period, e.g., forty seconds, and a second sound generator, e.g., a horn of the vehicle, for emitting sound at a second sound level louder than said first level upon expiration of the initial time period. The sounds are preferably repetitive and intermittent and continuous.

The arrangement includes an alarm deactivator mounted in the rear of the vehicle and accessible only upon when either rear door is in the open state, for manually deactivating the alarm. Advantageously, the alarm deactivator includes a pair of push button switches mounted in the rear of the vehicle, e.g., on the right and left rear pillars behind the rear seat on the driver's and passenger's sides of the vehicle. When manually actuated once, the alarm deactivator overrides the automatic activation of the arrangement. When manually actuated a plurality of times, e.g., five times, the alarm deactivator temporarily overrides the automatic activation of the arrangement only for a given amount of time, e.g., three hours. Upon expiration of the three hours, for example, the arrangement automatic activates itself again. The controller is also operative for cancelling the automatic activation of the arrangement when either rear door has been in the closed state for a time-out period, e.g., three minutes, during which the activated state of the ignition has not been detected.

In accordance with another aspect of this invention, a safety method of alerting an operator of a parked vehicle having an ignition and a rear door that a rear occupant is still present in a rear of the vehicle, is performed by detecting when the rear door is in an open state and in a closed state; detecting when the ignition is in an activated state and in a deactivated state; automatically activating the method when the rear door has been in the open state for a predetermined time period, and generating an alert signal in response to detection of the activated state of the ignition, followed by subsequent detection of the deactivated state of the ignition; and alerting the operator with an alarm in response to generating the alert signal that removal of the rear occupant from the parked vehicle is required.

Thus, the arrangement and method described herein are fail-safe in that they do not rely on weight-responsive switches, but are automatically self-activated to provide an alarm, preferably audible, to the vehicle operator of the continued presence of an animate or inanimate occupant in the rear of a parked vehicle that needs to be removed.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
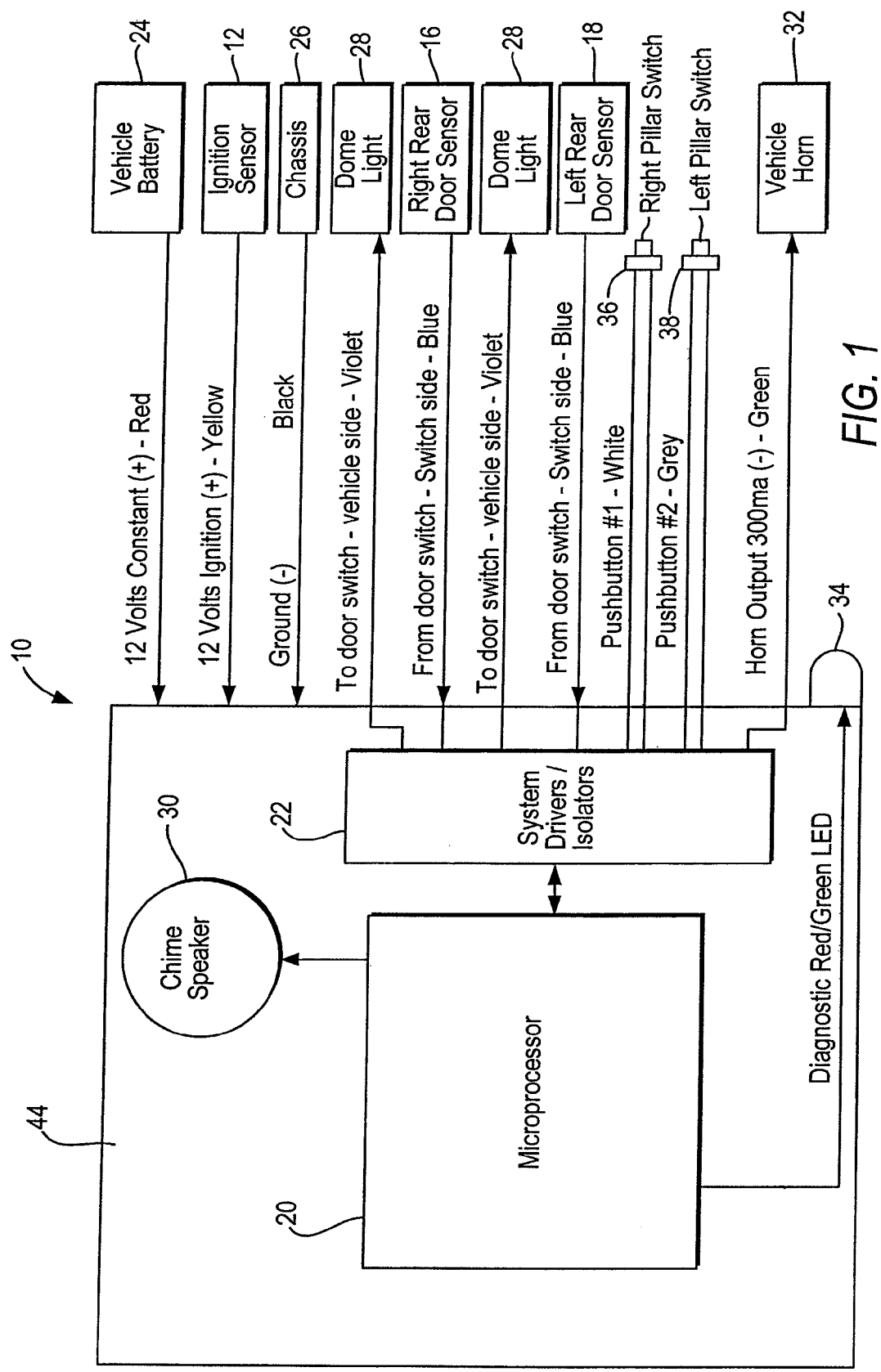
FIG. 1 is a schematic showing the overall arrangement and the method embodying the present invention.

Referring now to FIG. 1 of the drawings, reference numeral 10 generally identifies a safety arrangement for alerting an operator of a parked vehicle having an ignition and at least one rear door 14 (see FIG. 3) that a rear occupant is still present in a rear of the vehicle. The rear occupant is preferably a child or infant strapped into a safety seat, but can also be a child not using a safety seat, or any person, including an adult, especially one who is handicapped, either mentally or physically, or any animal, such as a pet dog or cat. The rear occupant could also be an inanimate object, such as a briefcase or some valuable, whose removal from the parked vehicle is desired.

The arrangement 10 includes a right door switch or sensor 16 provided for the right rear door 14, and a left door switch or sensor 18 provided for the left rear door 14. Each door sensor 16, 18 is operative for detecting when either rear door 14 is in an open state or in a closed state. An ignition sensor 12 is also provided for detecting when the ignition is in an activated (ON) state or in a deactivated (OFF) state. A programmed microprocessor or controller 20, together with system drivers, isolators and control circuitry 22, are mounted on a printed circuit board 44, and are responsive to each door sensor 16, 18 and the ignition sensor 12, for automatically activating the arrangement 10 when either rear door 14 has been in the open state for a predetermined time period, e.g., about three seconds. As explained below in connection with the flow chart of FIG. 2, the controller 20 generates an alert signal in response to detection of the activated state of the ignition, followed by subsequent detection of the deactivated state of the ignition. An alarm is responsive to the generation of the alert signal, for alerting the operator to remove the rear occupant from the parked vehicle.

Returning to FIG. 1, the arrangement 10 is powered via a red colored wire to a fused positive terminal of a 12 volt DC vehicle battery 24. A black colored wire electrically grounds the arrangement 10 to a vehicle chassis 26, which is connected to a negative terminal of the battery 24. The ignition switch or sensor 12 is connected via a yellow colored wire to the arrangement 10 and carries 12 volts DC when the ignition switch is in its RUN mode or its START mode. As shown in FIG. 4, the switch sides of the right and left rear door sensors 16, 18 are connected via two blue colored wires to the arrangement 10. The opposite vehicle sides of the right and left rear door sensors 16, 18 are connected via two violet colored wires to a vehicle dome light 28 (also see FIG. 3), or to a door sensing circuit of the vehicle. A buzzer or chime speaker 30 is connected to the controller 20. A horn 32 of the vehicle is also connected to the controller 20 via a green colored wire. A diagnostic indicator, such as light emitting diode (LED) 34, capable of emitting red and green light when the arrangement is armed or disarmed, is also connected to the controller 20.

Figure 3:
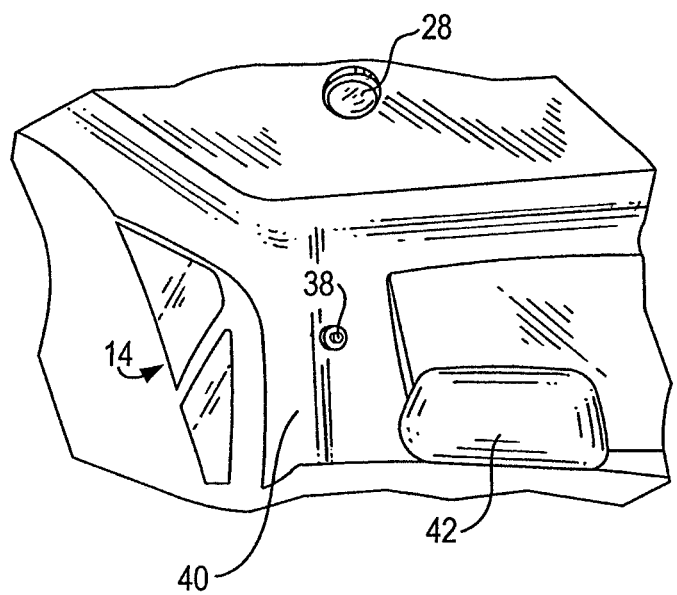
FIG. 3 is a broken-away, perspective view showing the positioning of a deactivation switch in a rear of a vehicle in which the arrangement is deployed.
Figure 4:
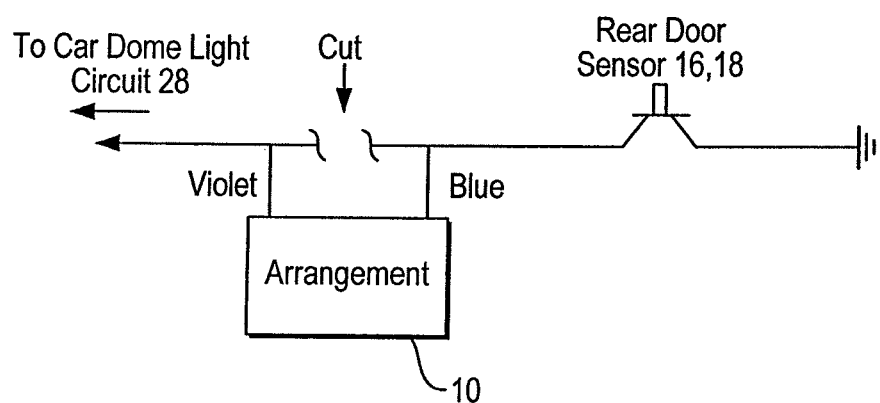
FIG. 4 is a circuit schematic showing how a rear door sensor switch is connected in the arrangement.

As shown in FIG. 3, a left push button switch 38 is mounted in the rear of the vehicle, e.g., on the left pillar 40 behind a rear seat 42 on the passenger's side of the vehicle, and is connected to the arrangement by a pair of white wires (FIG. 1). A right push button switch 36 is also mounted in the rear of the vehicle, e.g., on the right pillar behind the rear seat 42 on the driver's side of the vehicle, and is connected to the arrangement by a pair of grey wires (FIG. 1). Physical access to either push button switch 36, 38 cannot be readily achieved from the front of the vehicle. Such ready access is obtained only by opening the right and left rear doors 14.

Figure 2:
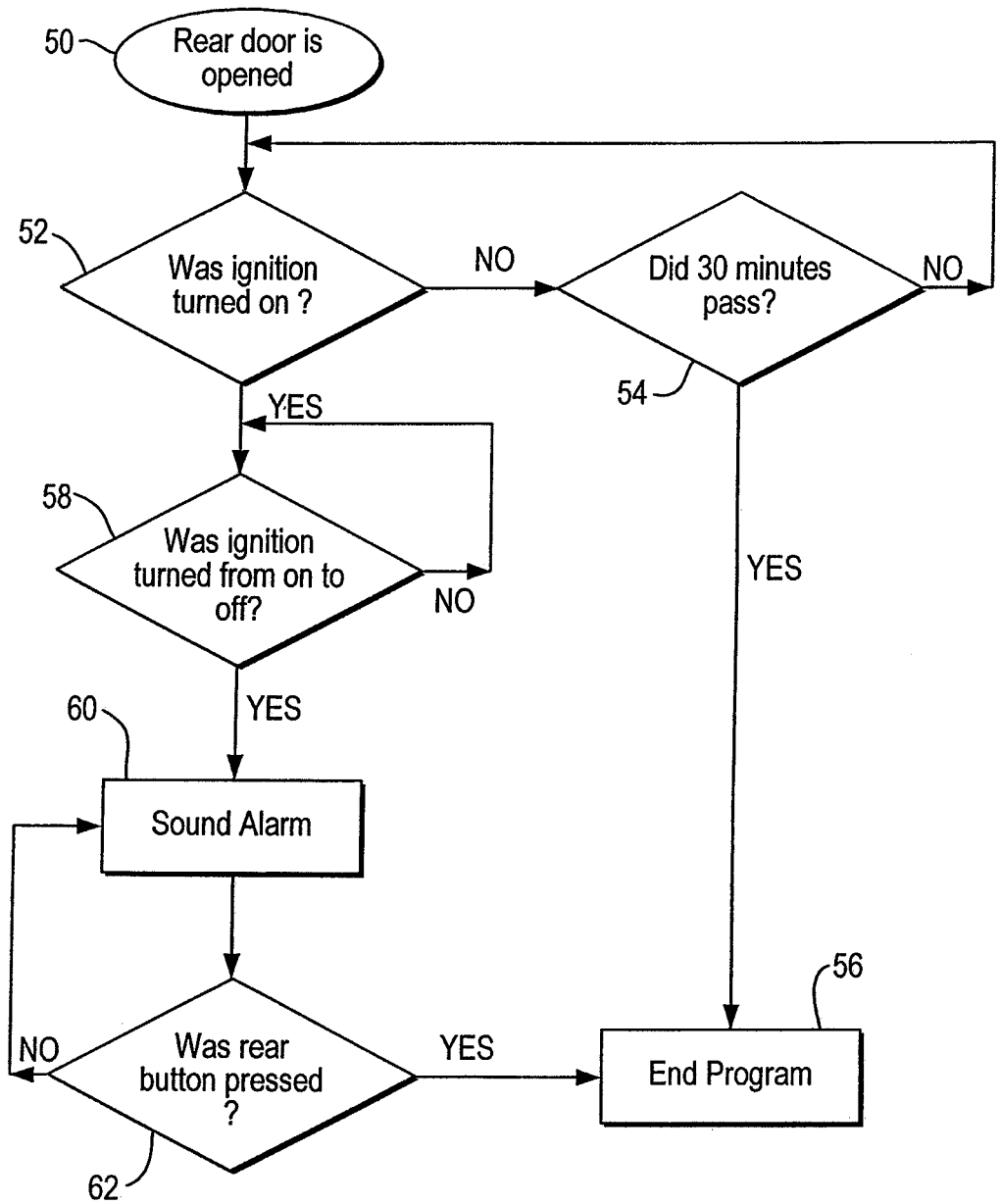
FIG. 2 is a flow chart showing certain steps in the operation of the arrangement and method of the present invention.

As shown in the flow chart of FIG. 2, in step 50, the controller 20 checks whether either of the door sensors 16, 18 has detected whether one of the rear doors 14 has been opened for more than the predetermined time period, e.g., about three seconds, and, if so, the arrangement 10 activates itself. This armed state can be indicated by a beep or chirp from the speaker 30, or by a light from the LED 34.

Next, the controller 20 checks, in step 52, whether the ignition sensor 12 has been activated. If not, then, the controller 20 checks, in step 54, whether a time-out period of, for example, eight, ten, fifteen or thirty minutes, has elapsed. If so, the controller 20 ends the program in step 56. If not, then the controller 20 continues to check whether the ignition sensor 12 has been activated.

If the ignition sensor 12 has been activated, the controller 20 next checks, in step 58, whether the ignition sensor 12 has been deactivated. If so, then the controller 20, in step 60, will initially energize the chime speaker 30 to emit sound at a first sound level for an initial time period, e.g., forty seconds, and then energize the horn 32 to emit sound at a second sound level louder than said first level upon expiration of the initial time period. The sounds are preferably repetitive and intermittent and continuous until one of the push button switches 36, 38 is manually actuated. The controller 20 checks, in step 62, whether one of the push button switches 36, 38 has been manually actuated and, if so, deenergizes the alarm, i.e., silences the chime speaker 30 or the horn 32. As noted above, the push button switches 36, 38 can only be deactivated when either rear door 14 is in the open state.

When manually actuated a plurality of times, e.g., five times, each push button switch 36, 38 temporarily overrides the automatic activation of the arrangement only for a given amount of time, e.g., three hours. Upon expiration of the three hours, for example, the arrangement automatic activates itself again. The controller is also operative for cancelling the automatic activation of the arrangement when either rear door 14 has been in the closed state for a time-out period during which the activated state of the ignition has not been detected.

As described, the arrangement 10 determines whether a child, pet, object, or other occupant must be removed from the rear seat based on a series of events that are fed to the controller 20, which receives inputs from the vehicle's rear door sensors 16, 18 and ignition sensor 12, and which outputs an audible warning if a sequence of inputs and events determines that an occupant has been placed in the vehicle's back seat and must be removed. The controller 20 receives its information via the sensors 16, 18 that sense the opening and closing of the rear doors 14 and from the vehicle's ignition sensor 12 that senses whether the ignition has been turned on or off. Conditions are determined based on a combination of the inputs to the controller and the amount of time that has passed between the events. Once the conditions are met and the arrangement is set, the audible warning will continue to sound until an input is received from one of the push button switches 36, 38 installed in the rear of the vehicle, thereby ensuring that at least one of the rear doors 14 is reopened. If the input is not received from the one of the push button switches 36, 38 within a predetermined amount of time, then the controller will trigger the vehicle's horn 32, whose loudness is more difficult to ignore.

Once the controller receives an input from one of the rear door sensors 16, 18, the arrangement automatically sets itself. The arrangement then "waits" for an ignition ON signal. If the controller receives an ignition ON signal, or if the ignition was already on during the rear door trigger, then the controller will enter an armed mode, in which the alarm will sound once the ignition is turned off. If the ignition ON signal is not received within a predetermined amount of time, then the "wait" status will be canceled, and the arrangement will be reset.

It will be understood that each of the elements described above, or two or more together, also may find a useful application in other types of constructions differing from the types described above. For example, as described above, the horn 32 would sound upon expiration of the initial time period, e.g., forty seconds, regardless of whether the rear door 14 was open or closed. In an advantageous modification, the horn 32 sounds after the initial time period only if the rear door 14 is not opened. Once the rear door 14 is opened, the horn 32 will sound after a longer time period, e.g., 10-15 minutes. As another example, as described above, if the ignition is not turned on within a set amount of time after the rear door 14 is opened, then the arrangement times out. In another advantageous modification, if the ignition is not turned on within a set amount of time after the rear door 14 is closed, then the arrangement times out.

While the invention has been illustrated and described as a safety arrangement for and a method of alerting a vehicle operator to remove a rear occupant from a parked vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A safety arrangement for alerting an operator of a parked vehicle having an ignition and a rear door that a rear occupant is still present in a rear of the vehicle, comprising:
a door sensor for detecting when the rear door is in an open state and in a closed state;
an ignition sensor for detecting when the ignition is in an activated state and in a deactivated state;
a programmed controller responsive to the door sensor and the ignition sensor, for automatically activating the arrangement when the rear door has been in the open state for a predetermined time period, and for generating an alert signal in response to detection of the activated state of the ignition, followed by subsequent detection of the deactivated state of the ignition;
an alarm responsive to generation of the alert signal, for alerting the operator to remove the rear occupant from the parked vehicle; and
an alarm deactivator mounted in the rear of the vehicle and accessible only upon when the rear door is in the open state, for manually deactivating the alarm.

2. The arrangement of claim 1, wherein the alarm includes a first sound generator for emitting sound at a first sound level for an initial time period, and a second sound generator for emitting sound at a second sound level louder than said first level upon expiration of the initial time period.

3. The arrangement of claim 2, wherein the first sound generator is a chime speaker, and wherein the second generator is a horn of the vehicle.

4. The arrangement of claim 1, wherein the alarm deactivator is a push button switch mounted in the rear of the vehicle.

5. The arrangement of claim 1, wherein the alarm deactivator overrides the automatic activation of the arrangement when manually actuated once.

6. The arrangement of claim 1, wherein the alarm deactivator temporarily overrides the automatic activation of the arrangement only for a given amount of time when manually actuated a plurality of times.

7. The arrangement of claim 1, wherein the controller is operative for cancelling the automatic activation of the arrangement when the rear door has been in the closed state for a time-out period during which the activated state of the ignition has not been detected.

8. The arrangement of claim 1, wherein the vehicle has another rear door; and another door sensor for detecting when the other rear door is in an open state and in a closed state; and wherein the controller is also responsive to the other door sensor for automatically activating the arrangement when the other rear door has been in the open state for the predetermined time period.

9. The arrangement of claim 1, wherein the predetermined time period is on the order of three seconds.

10. A safety method of alerting an operator of a parked vehicle having an ignition and a rear door that a rear occupant is still present in a rear of the vehicle, comprising the steps of:
detecting when the rear door is in an open state and in a closed state;
detecting when the ignition is in an activated state and in a deactivated state;
automatically activating the method when the rear door has been in the open state for a predetermined time period, and generating an alert signal in response to detection of the activated state of the ignition, followed by subsequent detection of the deactivated state of the ignition;
alerting the operator with an alarm in response to generating the alert signal that removal of the rear occupant from the parked vehicle is required; and
manually deactivating the alarm.

11. The method of claim 10, wherein the alerting step is performed by emitting sound at a first sound level for an initial time period, and by emitting sound at a second sound level louder than said first level upon expiration of the initial time period.

12. The method of claim 11, wherein the sound at the first sound level is emitted by a chime speaker, and wherein the sound at the second sound level is emitted by a horn of the vehicle.

13. The method of claim 10, wherein the manual deactivating step is performed by actuating a push button switch mounted in the rear of the vehicle.

14. The method of claim 10, wherein the manual deactivating step is performed once to override the automatic activation of the method.

15. The method of claim 10, wherein the manual deactivating step is performed a plurality of times to temporarily override the automatic activation of the arrangement only for a given amount of time.

16. The method of claim 10, and cancelling the automatic activation of the method when the rear door has been in the closed state for a time-out period during which the activated state of the ignition has not been detected.

17. The method of claim 10, wherein the vehicle has another rear door; and detecting when the other rear door is in an open state and in a closed state; and wherein the automatically activating step is also performed when the other rear door has been in the open state for the predetermined time period.

18. The method of claim 10, wherein the predetermined time period is on the order of three seconds.

* * * * *